US012266293B2

(12) United States Patent
Zhang

(10) Patent No.: US 12,266,293 B2
(45) Date of Patent: Apr. 1, 2025

(54) DISPLAY PANEL AND DISPLAY DEVICE

(71) Applicant: Wuhan Tianma Micro-Electronics Co., Ltd., Wuhan (CN)

(72) Inventor: Dian Zhang, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 32 days.

(21) Appl. No.: 18/237,588

(22) Filed: Aug. 24, 2023

(65) Prior Publication Data

US 2025/0006104 A1 Jan. 2, 2025

(30) Foreign Application Priority Data

Jun. 27, 2023 (CN) ......................... 202310771799.3

(51) Int. Cl.
*G09G 3/32* (2016.01)

(52) U.S. Cl.
CPC ....... *G09G 3/32* (2013.01); *G09G 2310/0275* (2013.01); *G09G 2310/0297* (2013.01); *G09G 2320/0233* (2013.01); *G09G 2330/021* (2013.01)

(58) Field of Classification Search
CPC ............. G09G 3/32; G09G 2310/0275; G09G 2310/0297; G09G 2320/0233; G09G 2330/021
USPC ............................................................ 345/55
See application file for complete search history.

(56) References Cited

U.S. PATENT DOCUMENTS

2022/0208874 A1* 6/2022 Zhang .................. H10K 59/121

FOREIGN PATENT DOCUMENTS

CN 115769203 A 3/2023

* cited by examiner

*Primary Examiner* — Amare Mengistu
*Assistant Examiner* — Gloryvid Figueroa-Gibson
(74) *Attorney, Agent, or Firm* — Anova Law Group, PLLC

(57) ABSTRACT

A display panel and a display device are provided. The display panel includes first data lines located in a first area and connected to first sub-pixels in the first area; second data lines located in a second area and connected to second sub-pixels in the second area; transfer lines located in a display area and connected to the first data lines; and demultiplexers including N switches. Input terminals of the N switches of a same demultiplexer are connected. A first data line is connected to a demultiplexer through a transfer line. i first data lines and j second data lines are connected to output terminals of the N switches. For the same demultiplexer, light-emitting color of first sub-pixels connected to the i first data lines is same as light-emitting color of second sub-pixels connected to the j second data lines; and N≥2, and i+j=N.

18 Claims, 14 Drawing Sheets

DISPLAY PANEL AND DISPLAY DEVICE

CROSS-REFERENCE TO RELATED APPLICATION

This application claims the priority of Chinese Patent Application No. 202310771799.3, filed on Jun. 27, 2023, the content of which is incorporated by reference in its entirety.

TECHNICAL FIELD

The present disclosure generally relates to the field of display technologies and, more particularly, relates to a display panel and a display device.

BACKGROUND

With the continuous development of display technologies, users have higher and higher requirements for display products. For example, the low power consumption of display products is a development trend at this stage. How to realize the low power consumption design of display products has become an urgent problem. The present disclosed display panel and display devices are direct to solve one or more problems set forth above and other problems in the arts.

SUMMARY

One aspect of the present disclosure provides a display panel. The display panel includes a display area including a first area, a second area and a first edge. In a first direction, the second area is located on a side of the first area away from the first edge, and an extending direction of the first edge intersects the first direction. The display panel also includes a plurality of first data lines located in the first area and connected to first sub-pixels in the first area; a plurality of second data lines located in the second area and connected to second sub-pixels in the second area; a plurality of transfer lines located in the display area and connected to the plurality of first data lines in a one-to-one correspondence; and a plurality of demultiplexers including a number N of switches. Input terminals of the number N of switches of a same demultiplexer may be connected. A first data line is connected to a demultiplexer through a transfer line, and a number i of first data lines and a number j of second data lines are connected to output terminals of the number N of switches in the same demultiplexer in a one-to-one correspondence; for the same demultiplexer, a light-emitting color of first sub-pixels connected to the number i of first data lines is same as a light-emitting color of second sub-pixels connected to the number j of second data lines; and N≥2, and i+j=N.

Another aspect of the present disclosure provides a display device. The display device includes a display panel. The display panel includes a display area including a first area, a second area and a first edge. In a first direction, the second area is located on a side of the first area away from the first edge, and an extending direction of the first edge intersects the first direction. The display panel also includes a plurality of first data lines located in the first area and connected to first sub-pixels in the first area; a plurality of second data lines located in the second area and connected to second sub-pixels in the second area; a plurality of transfer lines located in the display area and connected to the plurality of first data lines in a one-to-one correspondence; and a plurality of demultiplexers including a number N of switches. Input terminals of the number N of switches of a same demultiplexer may be connected. A first data line is connected to a demultiplexer through a transfer line, and a number i of first data lines and a number j of second data lines are connected to output terminals of the number N of switches in the same demultiplexer in a one-to-one correspondence; for the same demultiplexer, a light-emitting color of first sub-pixels connected to the number i of first data lines is same as a light-emitting color of second sub-pixels connected to the number j of second data lines; and N≥2, and i+j=N.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
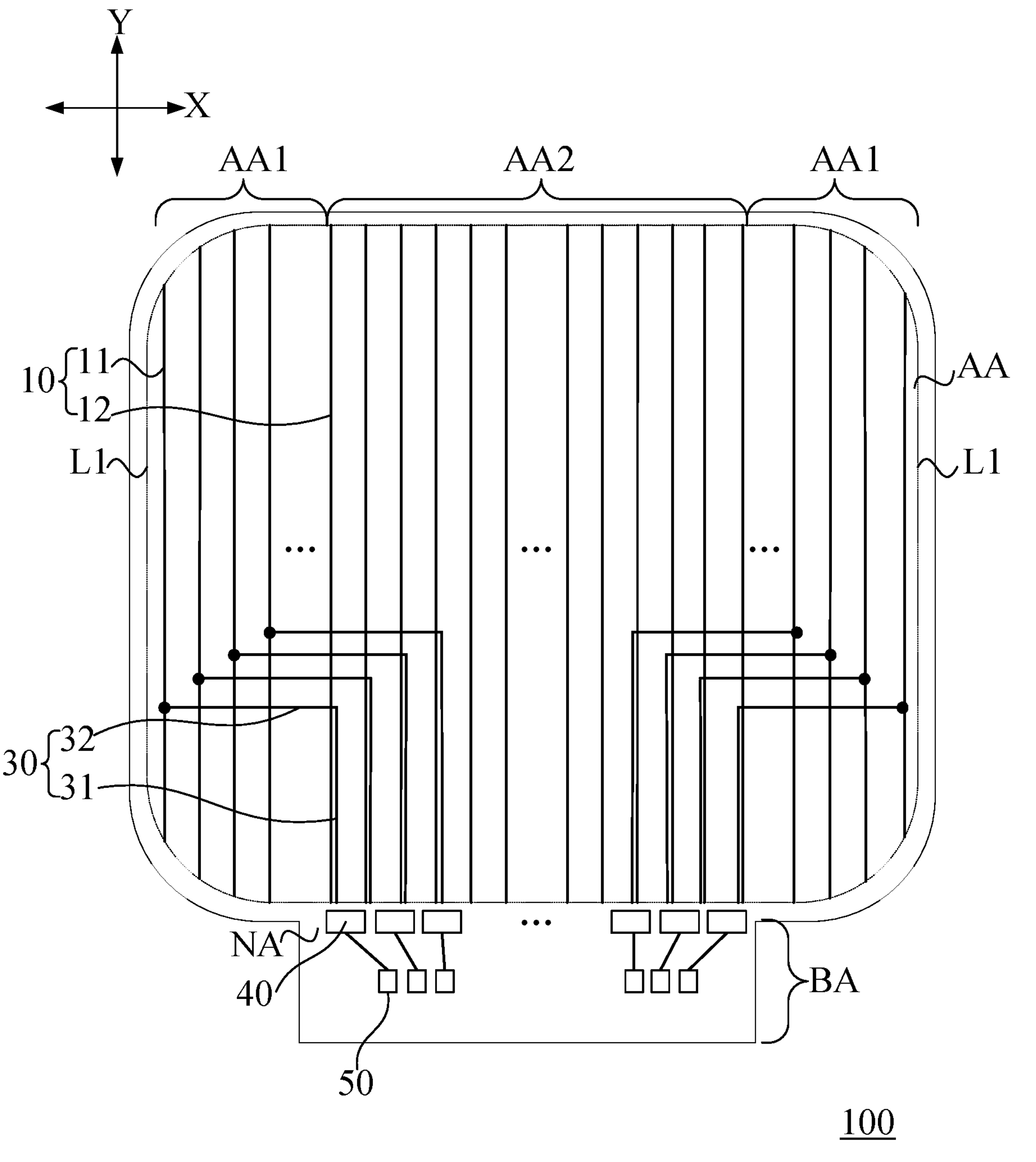
FIG. 1 illustrates a top view of an exemplary display panel according to various disclosed embodiments of the present disclosure.

The characteristics and exemplary embodiments of various aspects of the disclosure will be described in detail below. To make the purpose, technical solution and advantages of the disclosure clearer, the disclosure will be further described in detail below in conjunction with the accompanying drawings and specific embodiments. It should be understood that the specific embodiments described here are only configured to explain the disclosure, not to limit the disclosure. It will be apparent to one skilled in the art that the present disclosure may be practiced without some of these specific details. The following description of the embodiments is only to provide a better understanding of the present disclosure by showing examples of the present disclosure.

It should be noted that in this disclosure, relational terms such as first and second are only used to distinguish one entity or operation from another entity or operation, and do not necessarily require or imply that there is an actual relationship between these entities or operations. Furthermore, the term "comprises", "includes" or any other variation thereof is intended to cover a non-exclusive inclusion such that a process, method, article, or apparatus comprising a set of elements includes not only those elements, but also includes elements not expressly listed, and also includes elements inherent in such a process, method, article, or apparatus. Without further limitations, an element defined by the statement "comprising . . . " does not exclude the presence of additional same elements in the process, method, article or device comprising said element.

It should be understood that when describing the structure of a component, when a layer or a region is referred to as being "on" or "over" another layer or another region, it may mean being directly on another layer or another region, or other layers or regions are also included between them and another layer or another region. And, if the part is turned over, the layer, one region, will be "below" or "beneath" the other layer, another region.

It should be understood that the term "and/or" used herein is only an association relationship describing associated objects, which means that there may be three relationships, for example, A and/or B, which may mean that A exists alone, and A and B exist simultaneously, or B alone. In addition, the character "/" in this article generally indicates that the contextual objects are an "or" relationship.

In the present disclosure, the term "connection" may refer to a direct connection between two components, or may refer to a connection between two components via one or more other components.

It will be apparent to those skilled in the art that various modifications and changes may be made in the disclosure without departing from the spirit or scope of the disclosure. Therefore, the present application intends to cover the modifications and changes of the present disclosure falling within the scope of the corresponding claims (technical solutions to be protected) and their equivalents. It should be noted that the implementation manners provided in the embodiments of the present disclosure may be combined with each other if there is no contradiction.

The present disclosure provides a display panel and a display device. The display panel may be an organic light-emitting diode (OLED) display panel, or any another suitable type of display panel.

Figure 2:
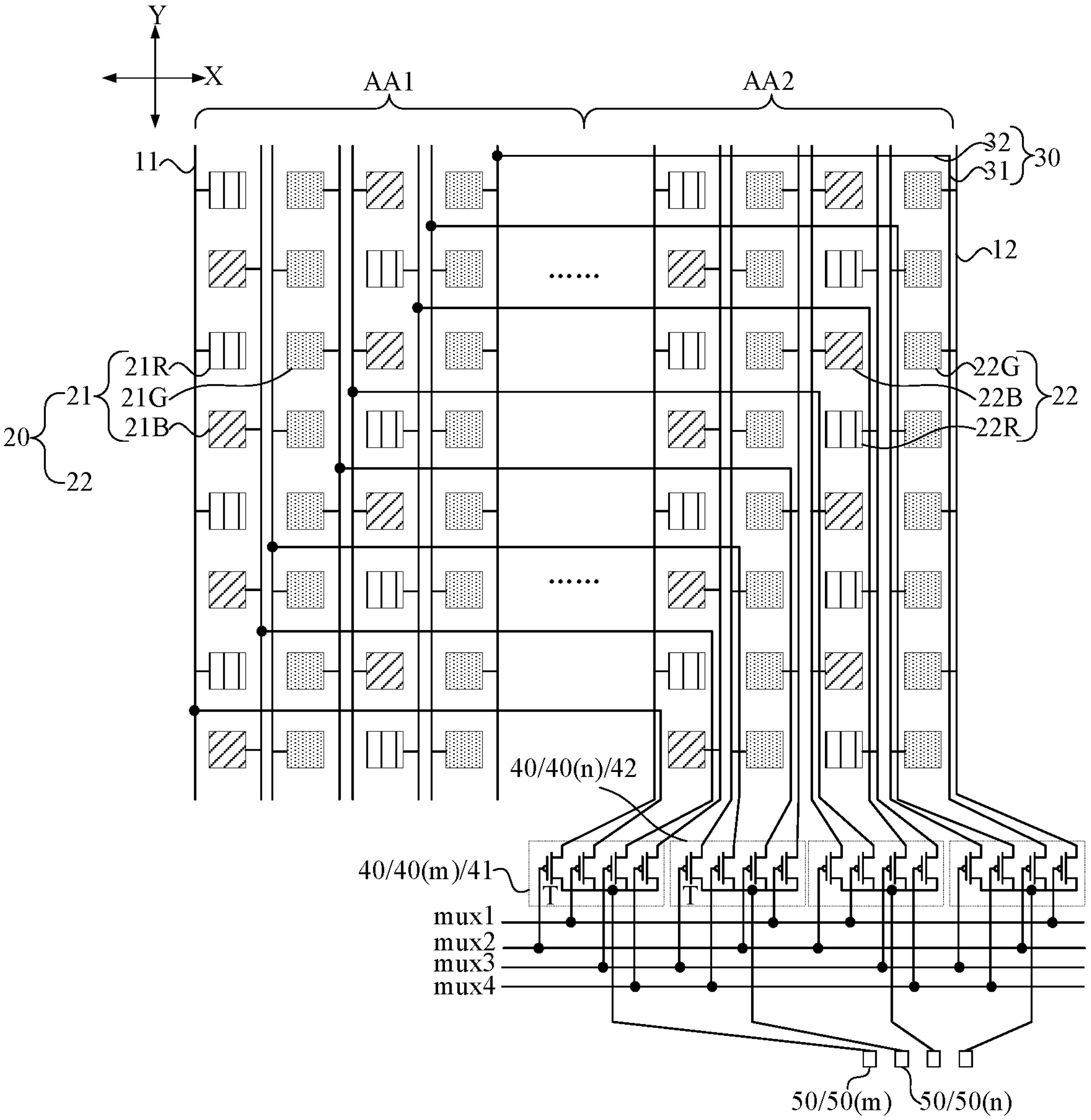
FIG. 2 illustrates an exemplary connection between a data line and demultiplexer of an exemplary display panel according to various disclosed embodiments of the present disclosure.

FIG. 1 shows a schematic top view of an exemplary display panel according to various disclosed embodiments of the present disclosure. FIG. 2 shows a schematic diagram of an exemplary connection between a data line and a demultiplexer of an exemplary display panel according to various disclosed embodiments of the present disclosure. As shown in FIGS. 1-2, the display panel 100 may include a display area AA. The display area AA may include a first area AA1, a second area AA2, and a first edge L1. In the first direction X, the second area AA2 may be located on the side of the first area AA1 away from the first edge L1, and the extending direction of the first edge L1 may intersect the first direction X.

The display panel 100 may include data lines 10, sub-pixels 20, transfer lines 30 and demultiplexers 40. The data lines 10 may include a first data line 11 and a second data line 12, and the sub-pixels 20 may include a first sub-pixel 21 and a second sub-pixel 22.

A plurality of first data lines 11 and a plurality of first sub-pixels 21 may be located in the first area AA1, and the first data lines 11 may be connected to the first sub-pixels 21. The first data lines 11 may be used to transmit data line signals to the first sub-pixels 21.

A plurality of second data lines 12 and a plurality of second sub-pixels 22 may be located in the second area AA2, and the second data lines 12 may be connected to the second sub-pixels 22. The second data lines 12 may be used to transmit data signals to the second sub-pixels 22.

A plurality of transfer lines 30 may be located in the display area AA. Multiple transfer lines 30 may be connected to multiple first data lines 11 in a one-to-one correspondence.

The number of demultiplexers 40 may be greater than one. The demultiplexer 40 may include a number N of switches T, and the input terminals of the number N of switches T in a same demultiplexer 40 may be connected together.

The first data line 11 may be connected to the demultiplexer 40 through the transfer line 30. A number i of first data lines 11 and a number j of second data lines 12 may be connected to the output terminals of the number N of switches in the same demultiplexer 40 in a one-to-one correspondence. For the same demultiplexer 40, the light-emitting color of the first sub-pixels 21 connected to the number i of first data lines 11 may be same as the light-emitting color of the second sub-pixels 22 connected to the number j of second data lines 12. $N \geq 2$, and $i+j=N$. i, j, and N may be all integers, $i \geq 1$, and $j \geq 1$.

It should be noted that FIG. 1 only schematically shows the data lines 10 included in the display panel, and does not limit the number of data lines 10 actually included in the display panel. Similarly, the number of transfer lines 30 shown in FIG. 1 is only for illustration, and does not represent the actual number of transfer lines 30.

In one embodiment, the number of the first edges L1 may be two, and the two first edges L1 may be opposite in the first direction X. The number of the first areas AA1 may be two, one of the first areas AA1 may be adjacent to one of the first edges L1, and the other first area AA1 may be adjacent to the other first edge L1. It can be understood that, in the first direction X, the first area AA1 may be located at the edge area of the display panel 100, and the second area AA2 may be located at the middle area of the display panel 100.

In one embodiment, the display panel 100 may further include a non-display area NA located on at least one side of the display area AA in the second direction Y, and the demultiplexers 40 may be located in the non-display area NA. The non-display area NA may also include a plurality of data signal terminals Source. The input terminals of multiple switches T in the same demultiplexer 40 may be connected to a same data signal terminal Source, and the output terminals of multiple switches T in the same demultiplexer 40 may be connected to different data lines. Multiple switches T in the demultiplexers 40 may be turned on sequentially such that the demultiplexers 40 may sequentially transmit the data signal provided from the same data signal terminal 50 to different data lines. The data signal terminal 50 may be connected to the driving chip, that is, the data signal may be provided by the driving chip.

Taking a white screen as an example, the data signals required by the sub-pixels of different light-emitting colors may be different. When the data signal terminal 50 provides data signals to the sub-pixels of different light-emitting colors, the data signal on the data signal terminal 50 may need to be continuously inverted. The more types of light-emitting colors of the sub-pixels connected to the same data signal terminal 50, the greater the signal inversion frequency of the data signal terminal 50 will be, resulting in greater power consumption of the driving chip.

The demultiplexer 40 may be connected to the driving chip through the data signal terminal 50. In one embodiment of the present disclosure, because for the data lines connected to the same demultiplexer 40, the light-emission color of the first sub-pixels 21 connected to the number of i first data lines 11 and the light-emitting color of the second sub-pixels 22 connected to the number j of second data lines 12 may be same such that the types of light-emitting colors of the sub-pixels connected to the data signal terminals 50 connected to the same demultiplexer 40 may be reduced. For example, when the white screen is displayed, the demultiplexers 40 may sequentially transmit the same data signal to the first data lines 11 and the second data lines 12. Therefore, the signal inversion frequency of the data signal terminal 50 connected to the demultiplexer 40 may be reduced. In another word, the signal inversion frequency of the driving chip may be reduced, or the driving signal may even not be inverted, which may be beneficial to reduce the power consumption of the driving chip.

In one embodiment, the display panel 100 may include a stepped area BA, a plurality of data signal terminals 50 may be disposed in the stepped area BA, and the data signal terminals 50 may be connected to a driving chip. In an actual application, the stepped area BA may be folded back to the non-light-emitting surface of the display panel to reduce the width of the lower frame of the display panel.

It should be noted that the configuration that the light-emission color of the first sub-pixels 21 connected to the number i of first data lines 11 is same as the light-emission color of the second sub-pixels 22 connected to the number of j of second data lines 12 is not used to limit that the first data line 11 may only be connected to the first sub-pixels 21 of one light-emitting color and the second data line 12 may only be connected to the second sub-pixels 22 of one light emitting color. For example, the light-emitting colors of the first sub-pixels 21 connected to the number i of first data lines 11 may include red and blue, and the light-emitting colors of the second sub-pixels 22 connected to the number j of second data lines 12 may also include red and blue. In such a configuration, it may also be considered that the light-emitting color of the first sub-pixels 21 connected to the number i of first data lines 11 is same as the light-emitting color of the second sub-pixels 22 connected to the number j of second data lines 12.

In the drawings of the present disclosure, sub-pixels filled with the same pattern may have the same light-emitting color, and sub-pixels filled with different patterns have different light-emitting colors.

In one embodiment, as shown in FIG. 2, the demultiplexer 40 may include four switches T. The switches T in the demultiplexer 40 may include transistors. The display panel may further include a first control signal line mux1, a second control signal line mux2, a third control signal line mux3, and a fourth control signal line mux4. The control terminals of the four switches T in the same demultiplexer 40 may be connected to the control signal lines mux1-mux4 in a one-to-one correspondence. The first control signal line mux1 to the fourth control signal line mux4 may sequentially provide turn-on signals to control the four switches in the demultiplexer 40 to conduct sequentially.

The first sub-pixels 21 may include a first sub-pixel 21R emitting red light, a first sub-pixel 21G emitting green light, and a first sub-pixel 21B emitting blue light. The second sub-pixels 22 may include a second sub-pixel 22R emitting red light, a second sub-pixel 22G emitting green light, and a second sub-pixel 22B emitting blue light.

The first data line 11 connected to the first sub-pixel 21R, the first data line 11 connected to the first sub-pixel 21B, the second data line 12 connected to the second sub-pixel 22R, and the second data line 12 connected to the second sub-pixel 22B may be connected to different output terminals of the m-th demultiplexer 40(*m*). The input terminal of the m-th demultiplexer 40(*m*) may be connected to the m-th data signal terminal 50(*m*).

The first data line 11 connected to the first sub-pixel 21G and the second data line 12 connected to the second sub-pixel 22G may be connected to different output terminals of the n-th demultiplexer 40(*n*). The input terminal of the n-th demultiplexer 40(*n*) may be connected to the n-th data signal terminal 50(*n*).

Figure 3:
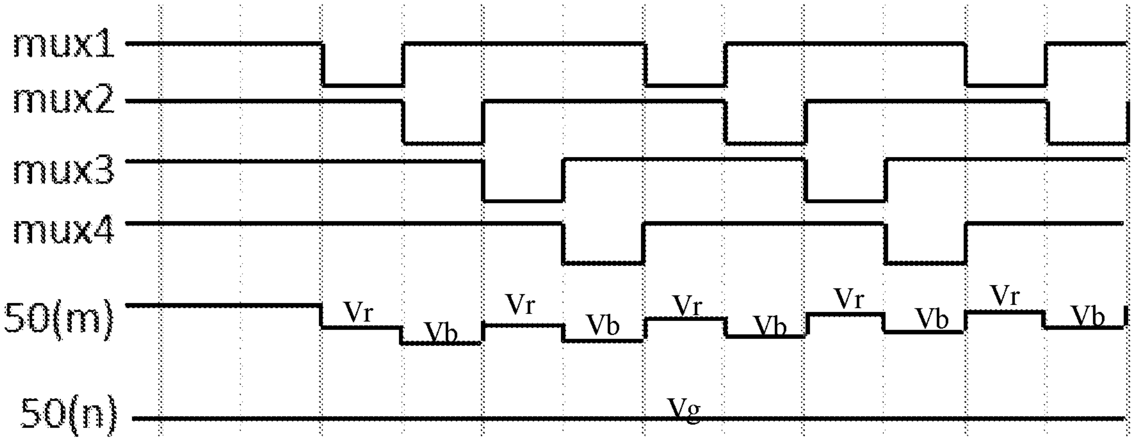
FIG. 3 illustrates an exemplary time sequence in FIG. 2.

As shown in FIG. 3, for example, when the control signal lines mux1-mux4 are at a low level, the switches T may be turned on, and when the control signal lines mux1-mux4 are at a high level, the switches T may be turned off.

In FIG. 3, Vr represents the data signal required by the sub-pixel emitting red light, Vg represents the data signal required by the sub-pixel emitting green light, and Vb represents the data signal required by the sub-pixel emitting blue light.

The m-th data signal terminal 50(*m*) may need to provide the data signal Vr and the data signal Vb, and the n-th data signal terminal 50(*n*) may need to provide the data signal Vg.

Figure 4:
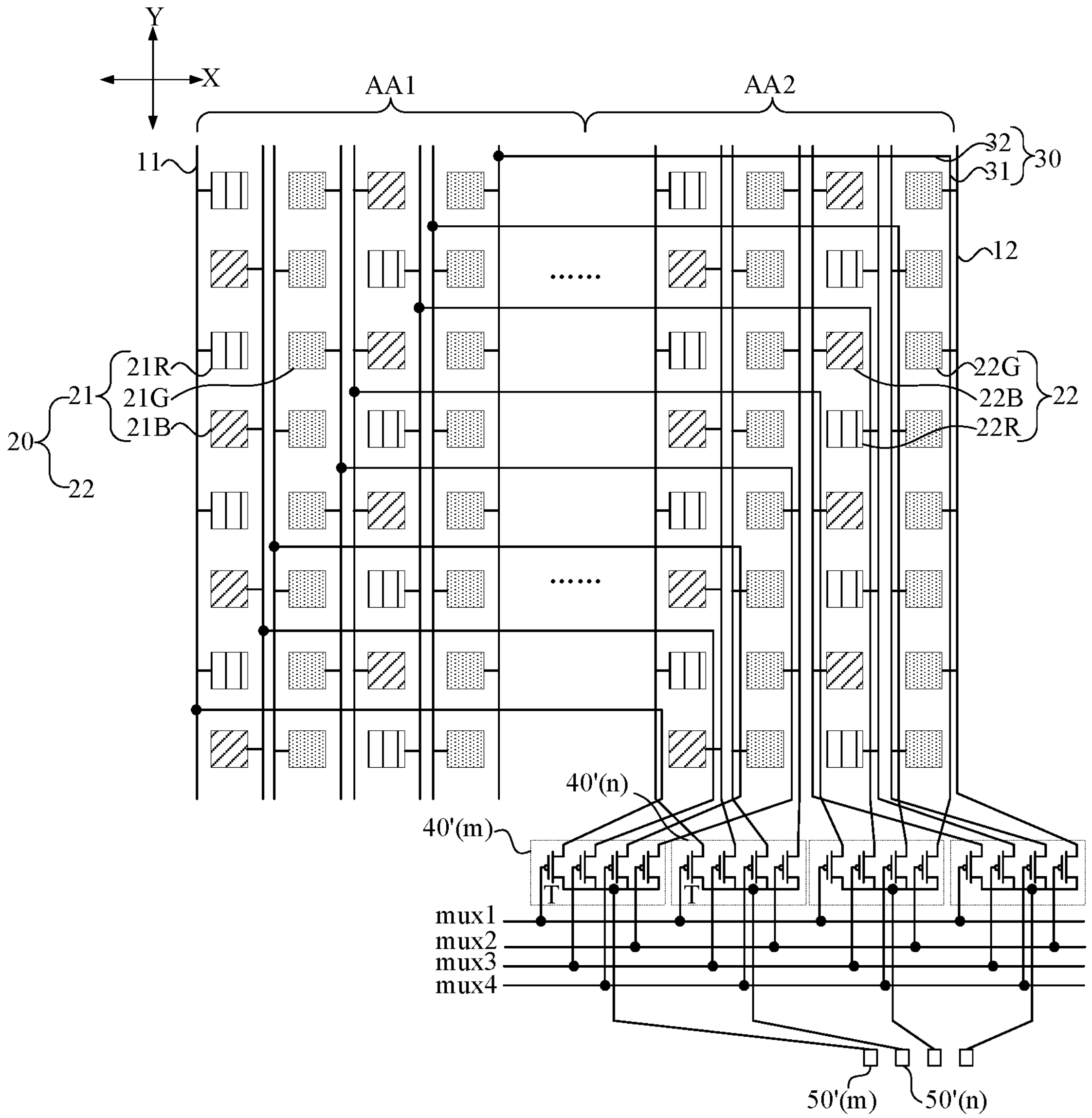
FIG. 4 illustrates an exemplary connection between a data line and a demultiplexer of a reference display panel.
Figure 5:
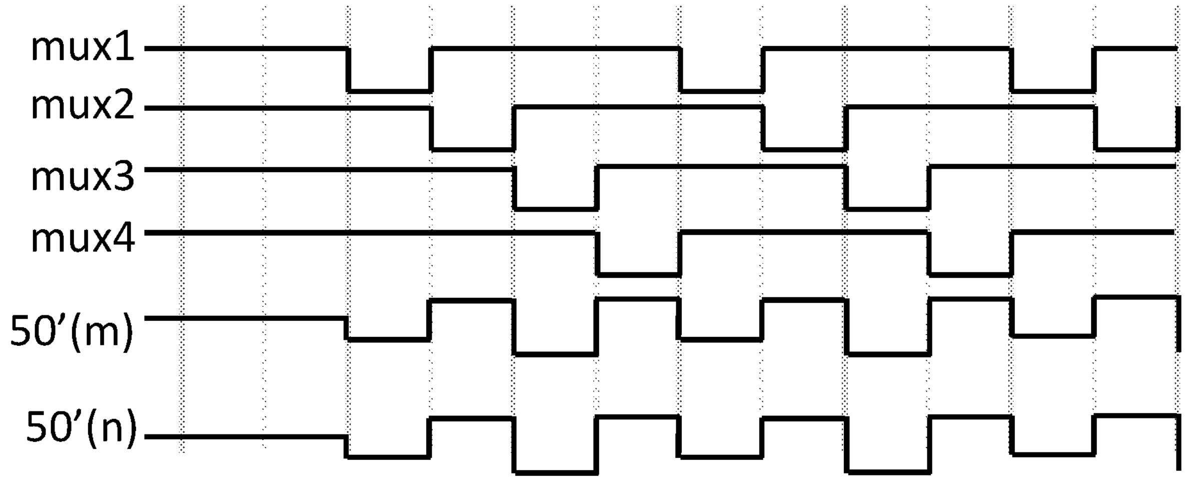
FIG. 5 illustrates a time sequence in FIG. 4.

The similarities between FIG. 4 and FIG. 2 will not be repeated, and the similarities between FIG. 5 and FIG. 3 will not be described again. The difference may include that the first data line 11 and the second data line 12 may no longer share the demultiplexer. The demultiplexers connected to the first data line 11 may be independent of the demultiplexers connected to the second data line 12. For example, the first data line 11 may be connected to the demultiplexer 40'(*m*), the second data line 12 may be connected to the demultiplexer 40'(*n*), the demultiplexer 40'(*m*) may be connected to the data signal terminal 50'(*m*), and the demultiplexer 40'(*n*) may be connected to the data signal terminal 50'(*n*).

As shown in FIG. 5, the data signal terminals 50'(*m*) and 50'(*n*) may need to provide data signal Vr, data signal Vb and data signal Vg.

Referring to FIG. 2 and FIG. 5 for comparison, compared with the data signal terminal 50'(*m*) and the data signal terminal 50'(*n*), both the data signal terminal 50(*m*) and the data signal terminal 50(*n*) may reduce the signal inversion frequency, and the signal on the data signal terminal 50(*n*) may not even be inverted. Therefore, the embodiment of the present disclosure may help reduce the power consumption of the driving chip.

In some embodiments, the number N of switches T in the demultiplexer 40 may be an even number, and i=j. For example, one half of the switches T in the demultiplexer 40 may be connected to the first data line 11, and the other half of the switches T in the demultiplexer 40 may be connected to the second data line 12. In such a configuration, the complexity of the driving sequence may be reduced, and the overall layout structure of the display panel may be simplified.

In one embodiment, the light-emitting colors of the first sub-pixels 21 in the first area AA1 include Q1 types, the light-emitting colors of the second sub-pixels 22 in the second area AA2 may include Q2 types, and the light-emitting colors of the first sub-pixels 21 may include Q11 types, and the light-emitting colors of the second sub-pixels 22 connected to the number j of second data lines 12 may also include Q11 types, Q11<Q1, and Q11<Q2.

For example, Q1=Q2=3, the light-emitting colors of the first sub-pixel 21 in the first area AA1 may include red, green and blue, and the light-emitting colors of the second sub-pixel 22 in the second area AA2 may also include red, green and blue.

In some optional embodiments, as shown in FIG. 2, the demultiplexer 40 may include a first demultiplexer 41 and a second demultiplexer 42. The first demultiplexer 41 may include a number N1 of switches, and N1≥2. The second demultiplexer 42 may include a number N2 of switches, and N2≥2.

A number i1 of first data lines 11 and a number j1 of second data lines 12 may be connected to the output terminals of the number N1 of switches in the same first demultiplexer 41 in a one-to-one correspondence, and for the same first demultiplexer 41, the light-emitting color of the first sub-pixel 21 connected with the number i1 of first data lines 11 may be same as the light-emitting color of the second sub-pixels 22 connected with the number j1 of second data lines 12, and i1+j1=N1.

A number i2 of first data lines 11 and a number j2 of second data lines 12 may be connected to the output terminals of N2 switches in the same second demultiplexer 42 in a one-to-one correspondence, and for the same second demultiplexer 42, the light-emitting colors of the first sub-pixels 21 connected with the number i2 of first data lines 11 may be same as the light-emitting color of the second sub-pixels 22 connected the number j2 of second data lines 12. N2≥2, and i2+j2=N2.

The light-emitting color of the first sub-pixels 21 connected to the number i1 of first data lines 11 corresponding to the first demultiplexer 41 may be different from the light-emitting color of the first sub-pixels 21 connected to the number i2 of first data lines 11 corresponding to the second demultiplexer 42. The light-emitting color of the second sub-pixels 22 connected to the number j1 of second data lines 12 corresponding to the first demultiplexer 41 may be different from the light-emitting color of the second sub-pixels 22 connected to the number j2 of second data lines 12 corresponding to the second demultiplexer 42. For example, the sub-pixels connected to the first demultiplexer 41 may have different light-emitting colors from the sub-pixels connected to the second demultiplexer 42. N1, N2, i1, i2, j1, and j2 may all be integers.

In one embodiment, the light-emitting colors of the sub-pixels connected to the first demultiplexer 41 may be different from the light-emitting colors of the sub-pixels connected to the second demultiplexer 42, which may be equivalent to assigning sub-pixels of multiple different light-emitting colors to different demultiplexers. In such a configuration, the first demultiplexer 41 and the second demultiplexer 42 may only need to provide the data signals required by the sub-pixels of a portion of the light-emitting colors. For example, the data signal terminals 50 connected to the first demultiplexer 41 and the second demultiplexer 42 may only need to provide the data signals required by the sub-pixels of some light-emitting colors such that the signal inversion frequency of the data signal terminals 50 connected to the demultiplexers 40 may be further reduced, thereby further reducing the signal inversion frequency of the driving chip.

In one embodiment, the light-emitting colors of the first sub-pixels 21 in the first area AA1 and the light-emitting colors of the second sub-pixels 22 in the second area AA2 may both include Q3 types, and the light-emitting colors of the sub-pixels connected to the first gate circuit 41 may include Q31 types, the sub-pixels connected to the second demultiplexer 42 may emit Q32 types of colors, Q31+Q32=Q3, and the colors in the Q31 types may be different from the colors in the Q32 types.

In some optional embodiments, i1=j1, i2=j2. In such a configuration, the number N1 of switches in the first demultiplexer 41 may be an even number, and the number N2 of switches in the second demultiplexer 42 may also be an even number. One half of the switches in the first demultiplexer 41 may be connected to the first data line 11, and the other half of the switches in the first demultiplexer 41 may be connected to the second data line 12. Similarly, one half of the switches in the second demultiplexer 42 may be connected to the first data line 11, and the other half of the switches in the second demultiplexer 42 may be connected to the second data line 12. Accordingly, the complexity of the driving sequence may be reduced, and the overall layout structure of the display panel may be simplified.

In some optional embodiments, i1=j1, i2=j2, and i1=i2, j1=j2. In such a configuration, N1=N2, and N1 and N2 are even numbers. Accordingly, it may be more conducive to reducing the complexity of the driving sequence, and more conducive to simplifying the overall layout structure of the display panel.

In some optional embodiments, i1=j1=2, i2=j2=2. In such a configuration, N1=N2=4. It may be understandable that the larger the numbers of N1 and N2 are, the more favorable the narrow frame design of the display panel may be. However, the larger the number of N1 and N2 is, the more unfavorable it is for the high refresh rate driver design. In the case of N1=N2=4, it may be beneficial to take into account both the narrow frame design of the display panel and the driving design of a high refresh rate.

In some optional embodiments, as shown in FIG. 2, the first data line 11 and the second data line 12 may extend along a second direction Y, and the second direction Y may intersect the first direction X. The first direction X may be a row direction, and the second direction Y may be a column direction.

Every two adjacent columns of first sub-pixels 21 in the first area AA1 may include a first sub-pixel column 21*a* and a second sub-pixel column 21*b*. The first sub-pixel column 21*a* may include first sub-pixels 21 of two types of light-emitting colors alternately arranged in the second direction Y. The second sub-pixel row 21*b* may include the first sub-pixels 21 of one light-emitting color. The light-emitting color of the first sub-pixel row 21*a* may be different from the light-emitting color of the second sub-pixel row 21*b*.

The four first data lines 11 connected to every two adjacent columns of first sub-pixels 21 in the first area AA1 may be respectively the k-th first data line 11(*k*), the (k+1)-th data line 11(*k*+1), the (k+2)-th first data line 11(*k*+2), and the (k+3)-th first data line 11(*k*+3) arranged in the first direction X. The k-th first data line 11*k* and the (k+3)-th first data line 11(*k*+3) may be connected to the first sub-pixels 21 in odd-numbered rows in different columns, and the (k+1)-th first data line 11(*k*+1) and the (k+2)-th first data line 11(*k*+2) may be connected to the first sub-pixels 21 in even-numbered rows in different columns.

Every two adjacent columns of second sub-pixels 22 in the second area AA2 may include the third sub-pixel column 22*a* and the fourth sub-pixel column 22*b*. The third sub-pixel column 22*a* may include second sub-pixels 22 of two light-emitting colors alternatively distributed in the second direction Y. The fourth sub-pixel column 22*b* may include the second sub-pixels 22 of one light-emitting color. The light-emitting color of the third sub-pixel column 22*a* and the light-emitting color of the first sub-pixel column 21*a* may be same, and the light-emitting color of the fourth sub-pixel column 22*b* may be same as the light-emitting color of the second sub-pixel column 21*b*.

The four second data lines 12 connected to every two adjacent columns of second sub-pixels 22 in the second area AA2 may be respectively the m-th second data line 12(*m*), the (m+1)-th second data line 12(*m*+1), the (m+2)-th second data line 12(*m*+2), and the (m+3)-th second data line 12(*m*+3) arranged in the first direction X. The m-th second data line 11(*m*) and the (m+3)-th second data line 11(*m*+3) may be connected to the second sub-pixels 22 in the odd-numbered rows in different columns, and the (m+1)-th second data line 11(*m*+1) and the (m+2)-th second data lines 11(*m*+2) may be connected to the second sub-pixels 22 in even-numbered rows in different columns.

The k-th first data line 11(*k*), the (k+1)-th first data line 11(*k*+1), the m-th second data line 12(*m*), and the (m+1)-th second data line 12(*m*+1) may be connected to the output terminals of the number N1 of switches in the same first demultiplexer 41 in a one-to-one correspondence, and the (k+2)-th first data line 11(*k*+2), the (k+3)-first data line 11(*k*+3), the (m+2)-th second data line 12(*m*+2) and the (m+3)-th second data line 12(*m*+3) and the output terminals of the number N2 of switches in a same second demultiplexer 42 may be connected in a one-to-one correspondence.

In one embodiment of the present disclosure, a column of sub-pixels may be configured with two data lines, and the odd-numbered and even-numbered rows of sub-pixels in a column of sub-pixels may be connected to different data lines. Two data lines may be used to transmit data signals to the same column of sub-pixels. Accordingly, it may be beneficial to realize the high refresh rate driving of the display panel.

In one embodiment, the first sub-pixel column 21*a* may include first sub-pixels 21R emitting red light and first sub-pixels 21B emitting blue light alternately arranged in the second direction Y, and the second sub-pixel column 21*b* may include first sub-pixels 21G emitting green light.

The third sub-pixel column 22*a* may include second sub-pixels 22R emitting red light and second sub-pixels 22B emitting blue light alternately arranged in the second direction Y, and the fourth sub-pixel column 22*b* may include second sub-pixels 22G emitting green light.

The first sub-pixel 21R emitting red light, the first sub-pixel 21B emitting blue light, the second sub-pixel 22R emitting red light, and the second sub-pixel 22B emitting blue light may be connected to the first demultiplexer 41, and the first sub-pixel 21G emitting green light and the second sub-pixel 22G emitting green light may be connected to the second demultiplexer 42.

The first demultiplexer 41 may be used to time-divisionally transmit the data signal Vr and the data signal Vb, and the second demultiplexer 42 may be used to transmit the data signal Vg.

In some optional embodiments, the turn-on sequences of the four switches connected to the k-th first data line 11(*k*), the (k+1)-th first data line 11(*k*+1), the (k+2)-th first data line 11(*k*+2) and the (k+3)-th first data line 11(*k*+3) may be different from the turn-on sequences of the four switches connected to the m-th second data line 12(*m*), the (m+1)-th second data line 12(*m*+1), the (m+2)-th second data line 12(*m*+2), and the (m+3)-th second data line 12(*m*+3).

For example, the display panel may include a first control signal line mux1, a second control signal line mux2, a third control signal line mux3, and a fourth control signal line mux4. Because the k-th first data line 11(*k*), the (k+1)-th first data line 11(*k*+1), the m-th second data line 12(*m*) and the (m+1)-th second data line 12(*m*+1) may be connected to the first demultiplexer 41, the (k+2)-th first data line 11(*k*+2), the (k+3)-th first data line 11(*k*+3), the (m+2)-th second data line 12(*m*+2) and the (m+3)-th second data line 12(*m*+3) may be connected to the second demultiplexer 42, under the condition that the turn-on sequence of the four switches connected to the data lines 11(*k*), 11(*k*+1), 11(*k*+2), 11(*k*+3) is different from that of the four switches connected to the data lines 12(*m*), 12(*m*+1), 12(*m*+2), and 12(*m*+3), only arranging the control signal lines mux1-mux4 may allow the first demultiplexer 41 and the second demultiplexer 42 to perform a correct time-division transmission of the data signal.

In some optional embodiments, the four switches connected to the k-th first data line 11(*k*), the (k+1)-th first data line 11(*k*+1), the (k+2)-th first data line 11(*k*+2), and the (k+3)-th first data line 11(*k*+3) may be turned on sequentially in the order of first, third, fourth, and second. The four switches connected to the m-th second data line 12(*m*), the (m+1)-th second data line 12(*m*+1), the (m+2)-th second data line 12(*m*+2), and the (m+3)-th second data line 12(*m*+3) may be turned on sequentially in the order of second, fourth, third, and first. In such a configuration, the correct time-division transmission of data signals by the first demultiplexer 41 and the second demultiplexer 42 may be realized.

In one embodiment, the switches with the same turn-on order in the first demultiplexer 41 and the second gate circuit 42 may be transistors of the same type, and the control signal lines connected to the switches with the same turn-on order in the first demultiplexer 41 and the second demultiplexer 42 may be same.

In one embodiment, as shown in FIG. 3, the first control signal line mux1, the second control signal line mux2, the third control signal line mux3 and the fourth control signal line mux4 may sequentially provide signals to turn on the switches for conduction.

Figure 6:
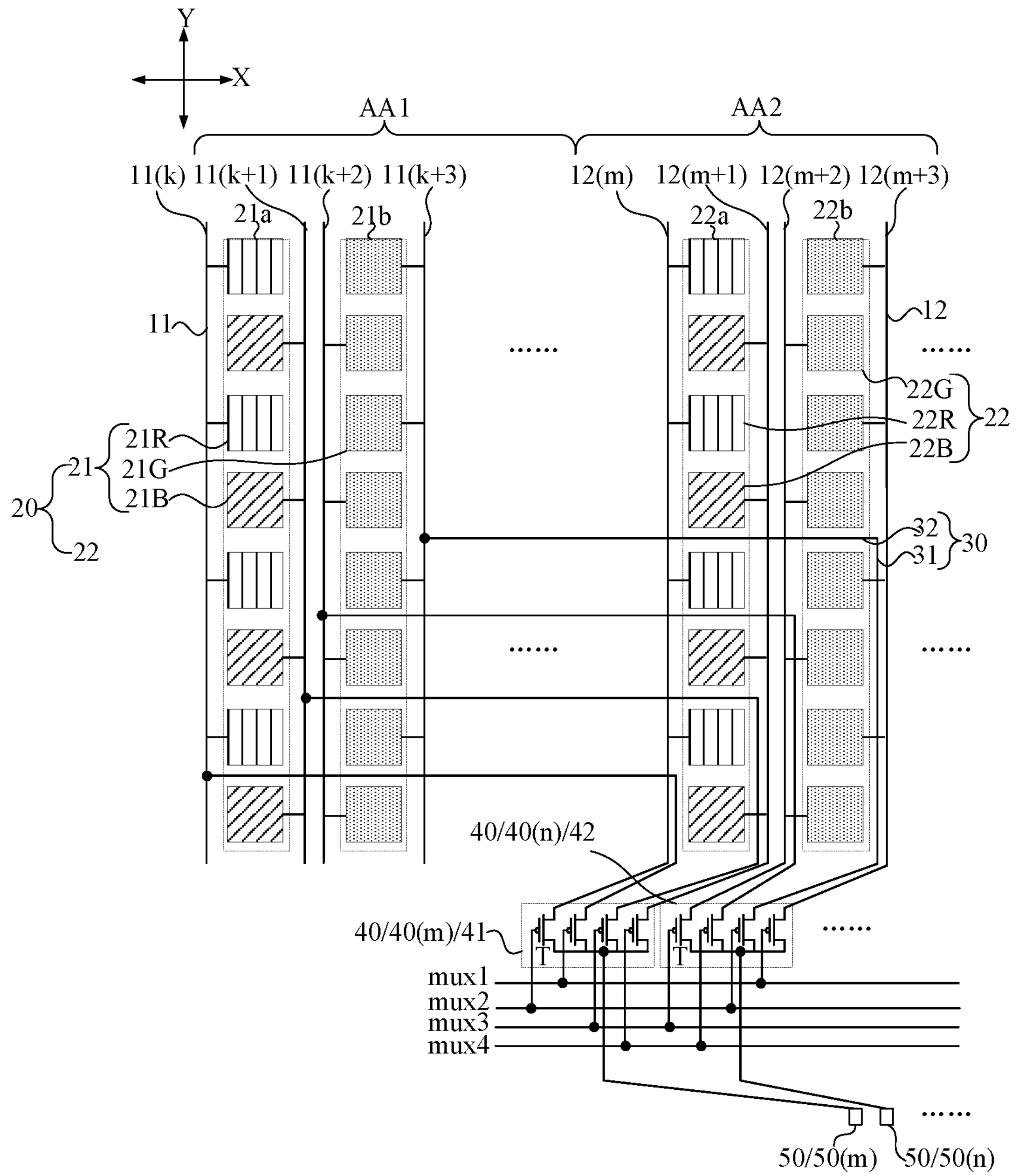
FIG. 6 illustrates another exemplary connection between a data line and a demultiplexer of an exemplary display panel according to various disclosed embodiments of the present disclosure.

As shown in FIG. 6, the control terminal of the switch connected to the k-th first data line 11(*k*) in the first demultiplexer 41 may be connected to the first control signal line mux1; the control terminal of the switch connected to the (k+1)-th first data line 11(*k*+1) may be connected to the third control signal line mux3; the control terminal of the switch connected to the m-th second data line 12(*m*) in the first demultiplexer 41 may be connected to the second control signal line mux2; and the control terminal of the switch connected to the (m+1)-th second data line 12(*m*+1) in the first demultiplexer 41 may be connected to the fourth control signal line mux4.

The control terminal of the switch connected to the (k+2)-th first data line 11 (*k*+2) in the second demultiplexer 42 may be connected to the fourth control signal line mux4.

The control terminal of the switch connected to the (k+3)-th switch first data line 11(*k*+3) in the second demultiplexer 42 may be connected to the second control signal line mux2. The control terminal of the switch connected to the (m+2)-th second data line 12(*m*+2) in the second demultiplexer 42 may be connected to the third control signal line mux3. The control terminal of the switch connected to the (m+3)-th second data line 12(*m*+3) in the second demultiplexer 42 may be connected to the first control signal line mux1.

Figure 7:
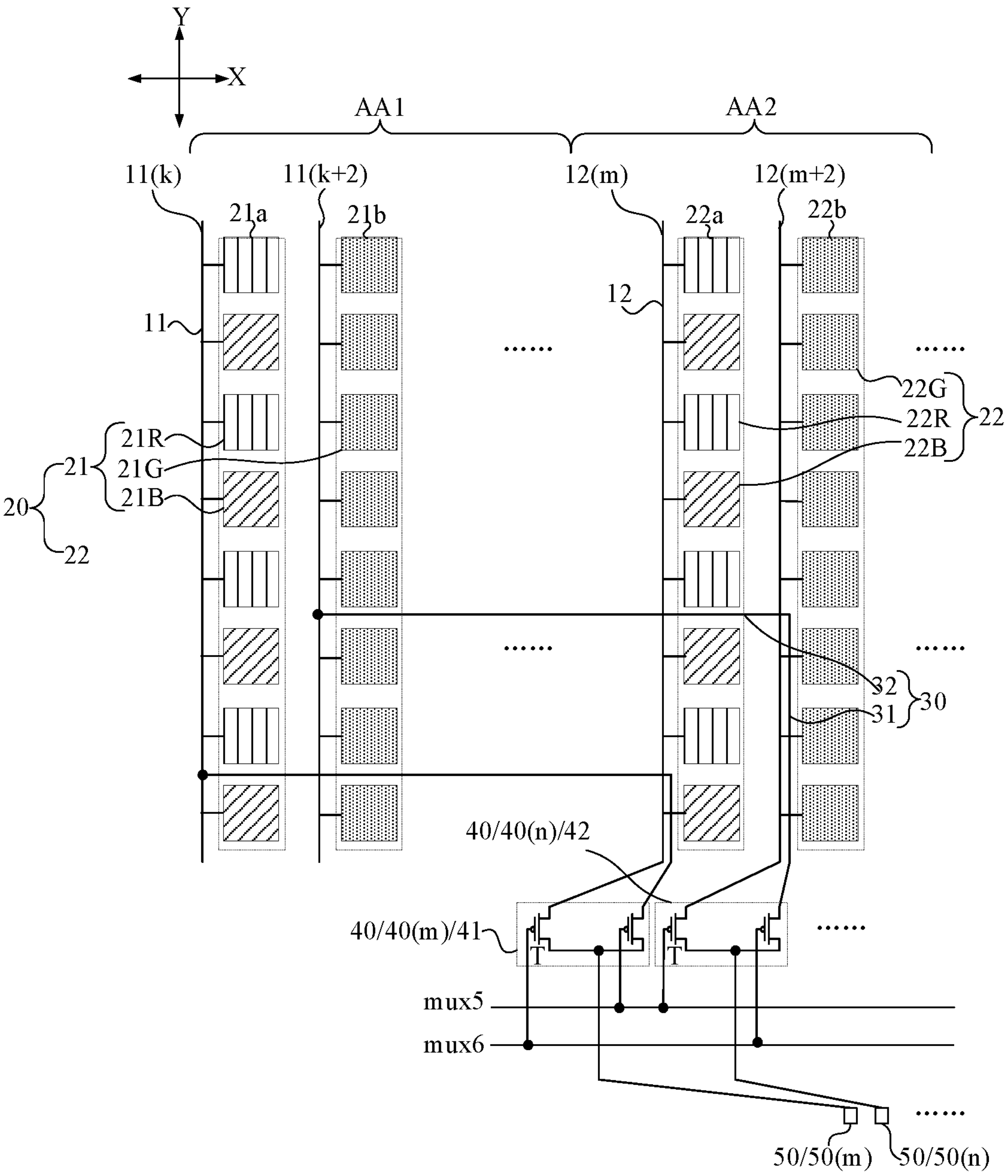
FIG. 7 illustrates another exemplary connection between a data line and a demultiplexer of an exemplary display panel according to various disclosed embodiments of the present disclosure.

In some optional embodiments, as shown in FIG. 7, i1=j1=1, and i2=j2=1. In such a configuration, N1=N2=2. As mentioned above, the larger the number of N1 and N2 is, the more unfavorable it is for the high refreshing rate driver design. In the case of N1=N2=2, it may be more conducive to the driver design of the high refreshing rate of the display panel.

In some optional embodiments, the first data line 11 and the second data line 12 may extend along the second direction Y, and the second direction Y may intersect the first direction X.

Every two adjacent columns of first sub-pixels 21 in the first area AA1 may include a first sub-pixel column 21*a* and a second sub-pixel column 21*b*. The first sub-pixel column 21*a* may include first sub-pixels 21 of two types of light-emitting colors alternately arranged in the second direction Y. The second sub-pixel column 21*b* may include the first sub-pixels 21 of one light-emitting color. The light-emitting color of the first sub-pixel column 21*a* may be different from the light-emitting color of the second sub-pixel column 21*b*. The first sub-pixel column 21*a* may be connected to the p-th first data line 11(*p*), and the second sub-pixel column 21*b* may be connected to the (p+1)-th first data line 11(*p*+1).

Every two adjacent columns of second sub-pixels 22 in the second area AA2 may include the third sub-pixel column 22*a* and the fourth sub-pixel column 22*b*. The third sub-pixel column may include the second sub-pixels 22 of two types of light-+emitting color alternatively arranged in the second direction Y, and the fourth sub-pixel column 22*b* may include the second sub-pixels 22 of one light-emitting color. The light-emitting color of the third sub-pixel column 22*a* and the light-emitting color of the first sub-pixel column 21*a* may be same. The light-emitting color of the fourth sub-pixel column 22*b* may be same as the light-emitting color of the second sub-pixel column 21*b*.

The third sub-pixel column 22*a* may be connected to the s-th second data line 12(*s*), and the fourth sub-pixel column 22*b* may be connected to the (s+1)-th second data line 12(*s*+1).

The p-th first data line 11(*p*) and the s-th second data line 12(*s*) may be connected to the output terminals of the number N1 of switches in the same first demultiplexer 41 in a one-to-one correspondence, and the (p+1)-th first data line 11(*p*+1) and the (s+1)-th second data line 12(*s*+1) may be connected to the output terminals of the number N2 of switches in the same second demultiplexer 42 in a one-to-one correspondence.

In the embodiment of the present disclosure, only one data line is configured for a column of sub-pixels, which may reduce the number of data lines and may be beneficial to the high-resolution design of the display panel.

In some optional embodiments, the turn-on sequence of the two switches connected to the p-th first data line 11(*p*) and the (p+1)-th first data line 11(*p*+1) may be different from that of the two switches connected to the first second data line 12(*s*) and the (s+1)-th second data line 12(*s*+1).

Figure 8:
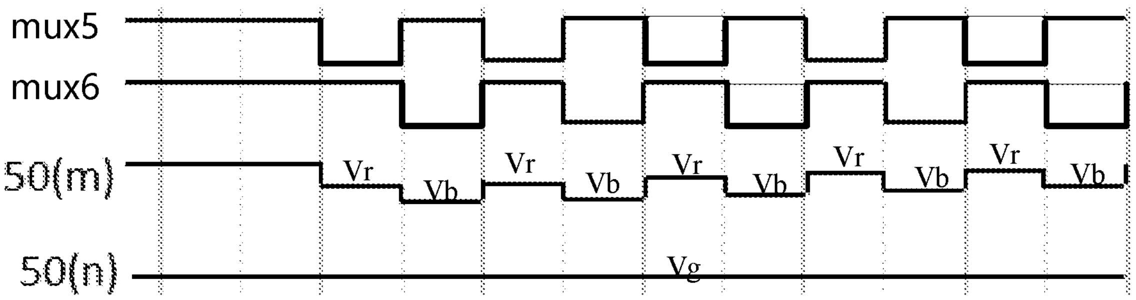
FIG. 8 illustrates an exemplary time sequence in FIG. 7.

For example, the display panel may include fifth and sixth control signal lines mux5 and mux6. As shown in FIG. 8, the fifth control signal line mux5 and the sixth control signal line mux6 may sequentially provide signals to turn on the switch for conduction.

Because the p-th first data line 11(*p*) and the s-th second data line 12(*s*) may be connected to the first gate circuit 41, the (p+1)-th first data line 11(*p*+1) and the (s+1)-th second data line 12(*s*+1) may be connected to the second demultiplexer 42. Under the condition that the turn-on sequence of the two switches connected to the first data line 11(*p*) and the first data 11(*p*+1) may be different from the turn-on sequence of the two switches connected to the second data line 12(*s*) and the second data line 12(*s*+1), only arranging the control signal line mux5 and mux6 may allow the first demultiplexer 41 and the second demultiplexer 42 to perform a correct time-division transmission of the data signals.

In some optional embodiments, the two switches connected to the p-th first data line 11(*p*) and the (p+1)-th first data line 11(*p*+1) may be sequentially turned on according to the order of the first and the second; and the two switches connected to the s-th second data line 12(*s*) and the (s+1)-th second data line 12(*s*+1) may be turned on sequentially in the order of the second and the first. In such a configuration, the correct time-division transmission of data signals by the first demultiplexer 41 and the second demultiplexer 42 may be realized.

For example, as shown in FIG. 8, when the control signal lines mux5-mux6 are at a low level, the switches T may be turned on, and when the control signal lines mux5-mux6 are at a high level, the switches T may be turned off.

In FIG. 8, Vr may represent the data signal required by the sub-pixel that emits red light, Vg may represent the data signal required by the sub-pixel that emits green light, and Vb may represent the data signal required by the sub-pixel that emits blue light.

The m-th data signal terminal 50(*m*) may only need to provide the data signal Vr and the data signal Vb, and the n-th data signal terminal 50(*n*) may only need to provide the data signal Vg.

Figure 9:
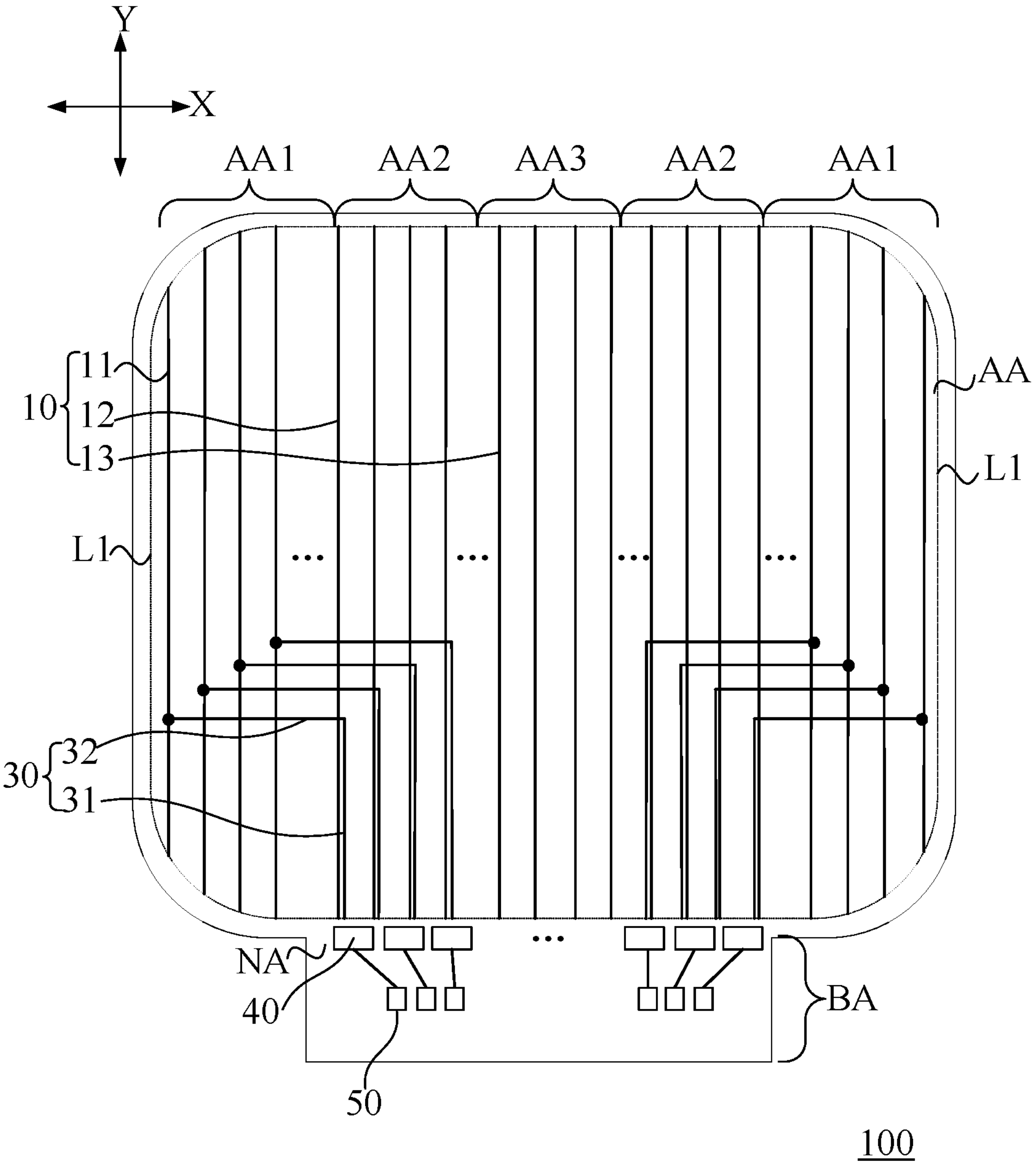
FIG. 9 illustrates a top view of another exemplary display panel according to various disclosed embodiments of the present disclosure.
Figure 10:
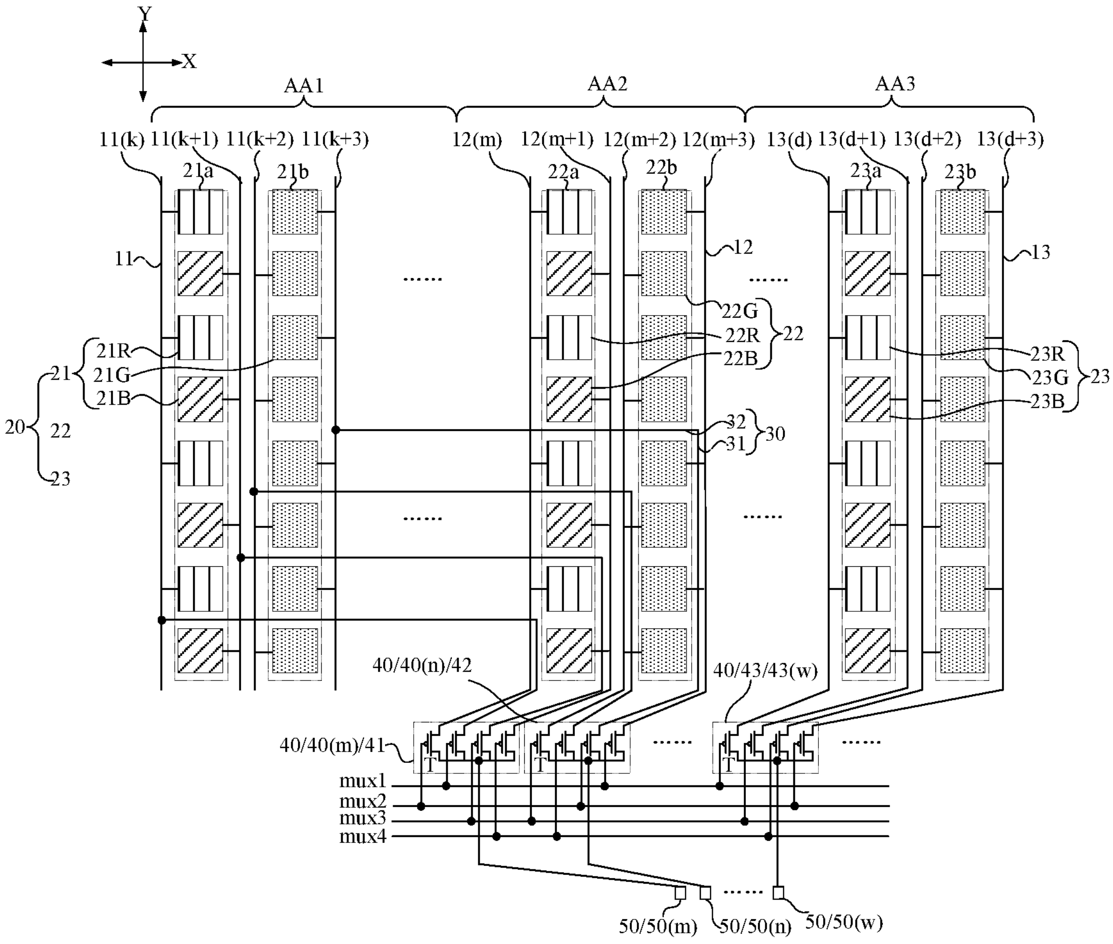
FIG. 10 illustrates another exemplary connection between a data line and a demultiplexer of an exemplary display panel according to various disclosed embodiments of the present disclosure.
Figure 11:
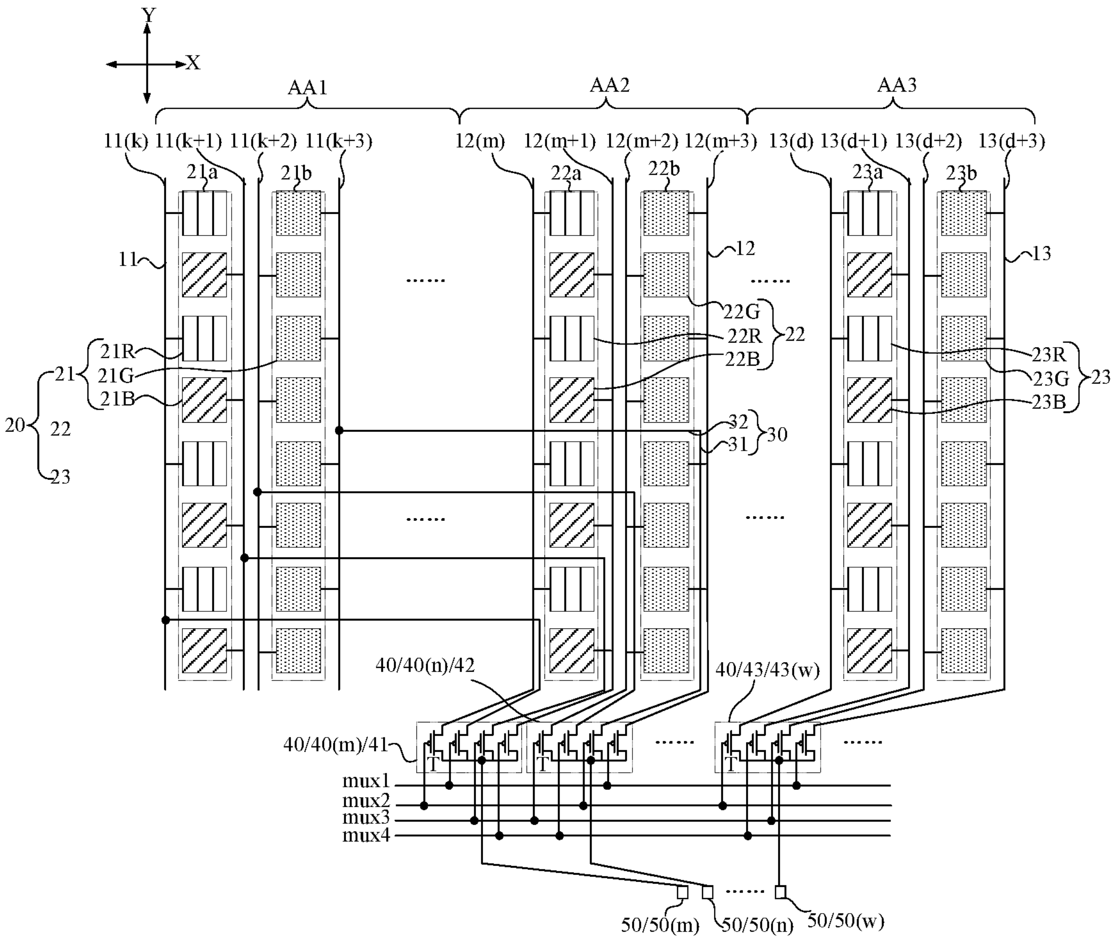
FIG. 11 illustrates another exemplary connection between a data line and a demultiplexer of an exemplary display panel according to various disclosed embodiments of the present disclosure.

In some optional embodiments, as shown in FIG. 9 and FIG. 10 or FIG. 11, the display area AA may further include a third area AA3, and in the first direction X, the third area AA3 may be located in the side of the first area AA1 away from the first edge L1.

FIG. 9 shows that the second area AA2 may be located between the first area AA1 and the third area AA3. In other embodiments, the third area AA3 may be located between the first area AA1 and the second area AA2.

The display panel 100 may further include third data lines 13 and third sub-pixels 23. The demultiplexer 40 may include a third demultiplexer 43.

A plurality of third data lines 13 and a plurality of third sub-pixels 23 may be located in the third area AA3, and the third data lines 13 may be connected to the third sub-pixels 23. The third data lines 13 may be used to transmit data signals to the third sub-pixels 23.

The third demultiplexer 43 may include a number N3 of switches T. N3≥2; and N3 may be an integer.

The input terminals of the number N3 of switches T in the same third demultiplexer 43 may be connected together. For example, the input terminals of the number N3 of switches T in the w-th third demultiplexer 43(*w*) may connected to the w-th data signal terminal 50(*w*). The number N3 of third data lines 13 may be connected to the output terminals of the number N3 of switches T in the same third demultiplexer 43 in a one-to-one correspondence.

As shown in FIG. 10, the turn-sequences of the switches T connected to the third sub-pixels 23 and the first sub-pixels 21 located in a same row and having the same light-emitting color may be same. In another embodiment, as shown in FIG. 11, the turn-on sequences of the switches T connected to the third sub-pixels 23 and the second sub-pixels 22 located in the same row and having the same light-emitting color may be same. In such a configuration, the data signal driving orders of the sub-pixels with the same light-emitting color in the first area and the third area may be same, or the data signal driving orders of the sub-pixels with the same light-emitting color in the second area and the third area may be same, which may help to improve the display uniformity.

It should be noted that FIG. 9 only schematically shows the data lines 10 and sub-pixels 20 included in the display panel, and does not limit the number of data lines 10 and sub-pixels 20 actually included in the display panel. Similarly, the number of transfer lines 30 shown in FIG. 9 is only for illustration, and does not represent the actual number of transfer lines 30.

In one embodiment, as shown in FIG. 10, every two adjacent columns of third sub-pixels 23 in the third area AA3 may include a fifth sub-pixel column 23*a* and a sixth sub-pixel column 23*b*. The fifth subpixel column 23*a* may include third sub-pixels 23 of two light-emitting colors alternately arranged in the direction Y. The second sub-pixel column 21*b* may include the third sub-pixels 23 of one light-emitting color. The light-emitting color of the sixth sub-pixel column 23*b* may be different from the light-emitting color of the fifth sub-pixel column 23*a*.

In one embodiment, the first sub-pixel column 21*a* may include first sub-pixels 21R emitting red light and first sub-pixels 21B emitting blue light alternately arranged in the second direction Y, and the second sub-pixel column 21*b* may include the first sub-pixel 21G emitting green light. The third sub-pixel column 22*a* may include second sub-pixels 22R emitting red light and second sub-pixels 22B emitting blue light alternately arranged in the second direction Y. The fourth sub-pixel column 22*b* may include second sub-pixels 22G emitting green light. The fifth sub-pixel column 23*a* may include third sub-pixels 23R emitting red light and third sub-pixels 23B emitting blue light alternately arranged in the second direction Y. The sixth sub-pixel column 23*b* may include third sub-pixels 23G emitting green light.

The first sub-pixel 21R emitting red light, the first sub-pixel 21B emitting blue light, the second sub-pixel 22R emitting red light, and the second sub-pixel 22B emitting blue light may be connected to the first demultiplexer 41, and the first sub-pixel 21G emitting green light and the second sub-pixel 22G emitting green light may be connected to the second demultiplexer 42. The third sub-pixel 23R emitting red light, the third sub-pixel 23B emitting blue light, and a third sub-pixel 23G emitting green light may be connected to the third demultiplexer 30.

The four third data lines 13 connected to every two adjacent columns of third sub-pixels 23 in the third area AA1 may be respectively the d-th third data line 13(*d*) and the (d+1)-th third data line 13(*d*), the (d+2)-th third data signal line 13(*d*+2), and the (d+3)-th third data signal line 13(*d*+3) arranged in the first direction X. The d-th third data signal line 13(*d*), the (d+1)-th third data line 13(*d*+1), the (d+2)-th third data line 13(*d*+2), and the (d+3)-th third data line 13(*d*+3) may be connected to the third sub-pixels 23 in odd-numbered rows in different columns, and the (d+1)-th third data line 13(*d*+1) and the (d+2)-th third data line 13(*d*+2) may be connected to the third sub-pixels 23 in the even-numbered rows in different columns.

As shown in FIG. 10 or FIG. 11, both the first demultiplexer 41 and the second demultiplexer 42 may include four switches.

As shown in FIG. 10, the control terminal of the switch connected to the k-th first data line 11(*k*) in the first demultiplexer 41 may be connected to the first control signal line mux1; the control terminal of the switch connected to the (k+1)-th the first data line 11(*k*+1) may be connected to the third control signal line mux3; the control terminal of the switch connected to the (k+2)-th first data line 11(*k*+2) in the second demultiplexer 42 may be connected to the fourth control signal line mux4; the control terminal of the switch connected to the (k+3)-th first data line 11(*k*+3) in the second demultiplexer 42 may be connected to the fourth control signal line mux4; the control terminal of the the switch connected to the d-th third data line 13(*d*) in the third demultiplexer 41 may be connected to the first control signal line mux1; the control terminal of the switch connected to the (d+1)-th third data line 13(*d*+1) in the third demultiplexer 43 may be connected to the third control signal line mux3; the control terminal of the switch connected to the (d+2)-th third data line 13(*d*+2) in the third demultiplexer 43 may be connected to the fourth control signal line mux4; and the control terminal of the switch connected to the (d+3)-th third data line 13(*d*+3) in the third demultiplexer 43 may be connected to the second control signal line mux2. Therefore, the turn-on sequences of the switches connected to the third sub-pixels 23 and the first sub-pixels 21 that are located in the same row and have the same light-emitting color may be same.

In another embodiment, as shown in FIG. 11, the control terminal of the switch connected to the m-th second data line 12(*m*) in the first demultiplexer 41 may be connected to the second control signal line mux2; the control terminal of the switch connected to the (m+1)-th second data line 12(*m*+1) may be connected to the fourth control signal line mux4; the control terminal of the switch connected to the (m+2)-th second data line 12(*m*+2) in the second demultiplexer 42 may be connected to the fourth control signal line mux3; the control terminal of the switch connected to the (m+3)-th second data line 12(*m*+3) in the second demultiplexer 42 may be connected to the first control signal line mux1; the control terminal of the switch connected to the d-th third data line 13(*d*) in the third demultiplexer 41 may be connected to the second control signal line mux2; the control terminal of the switch connected to the (d+1)-th third data line 13(*d*+1) in the third demultiplexer 43 may be connected to the fourth control signal line mux4; the control terminal of the switch connected to the (d+2)-th third data line 13(*d*+2) in the third demultiplexer 43 may be connected to the third control signal line mux3; and the control terminal of the switch connected to the (d+3)-th third data line 13(*d*+3) in the third demultiplexer 43 may be connected to the first control signal line mux1. Therefore, the turn-on sequences of the switches connected to the third sub-pixels 23 and the first sub-pixels 21 that are located in the same row and have the same light-emitting color may be same.

Figure 12:
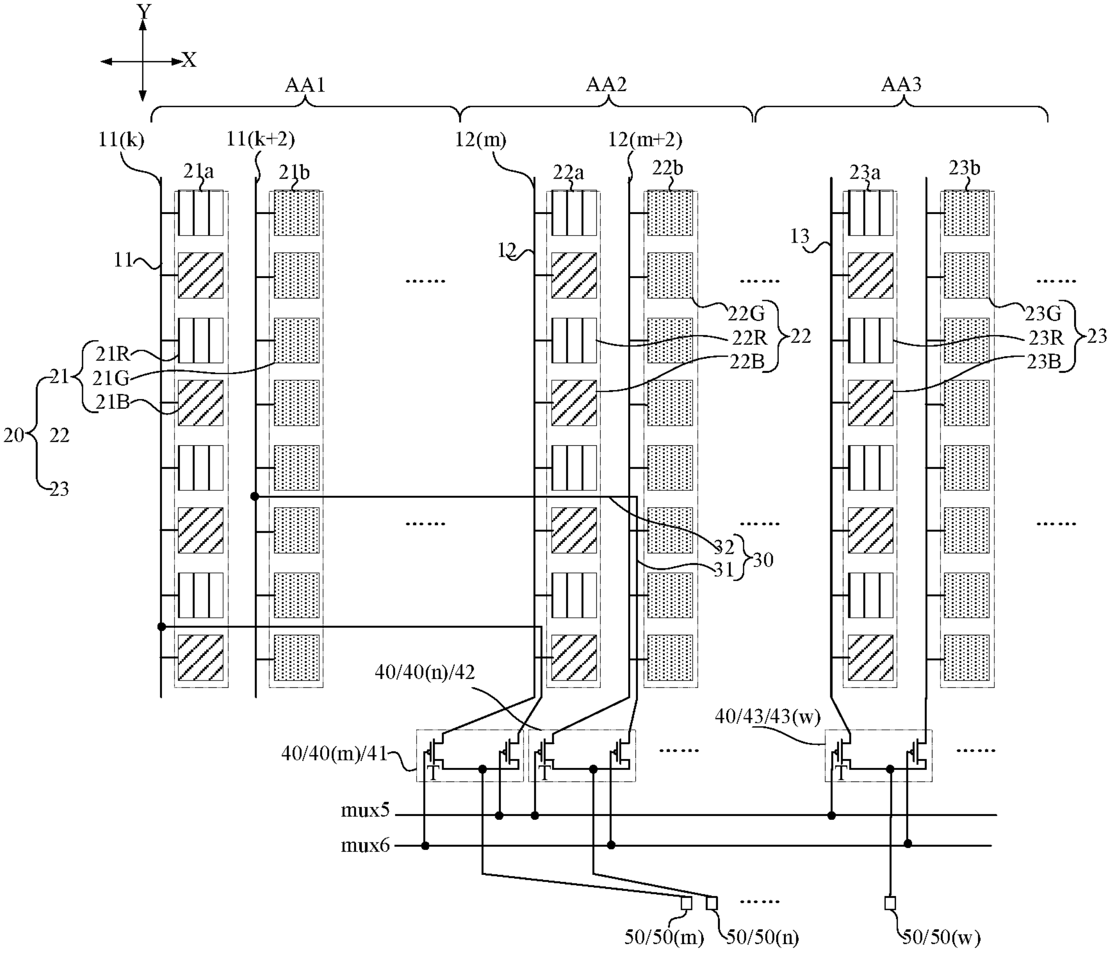
FIG. 12 illustrates another exemplary connection between a data line and a demultiplexer of an exemplary display panel according to various disclosed embodiments of the present disclosure.
Figure 13:
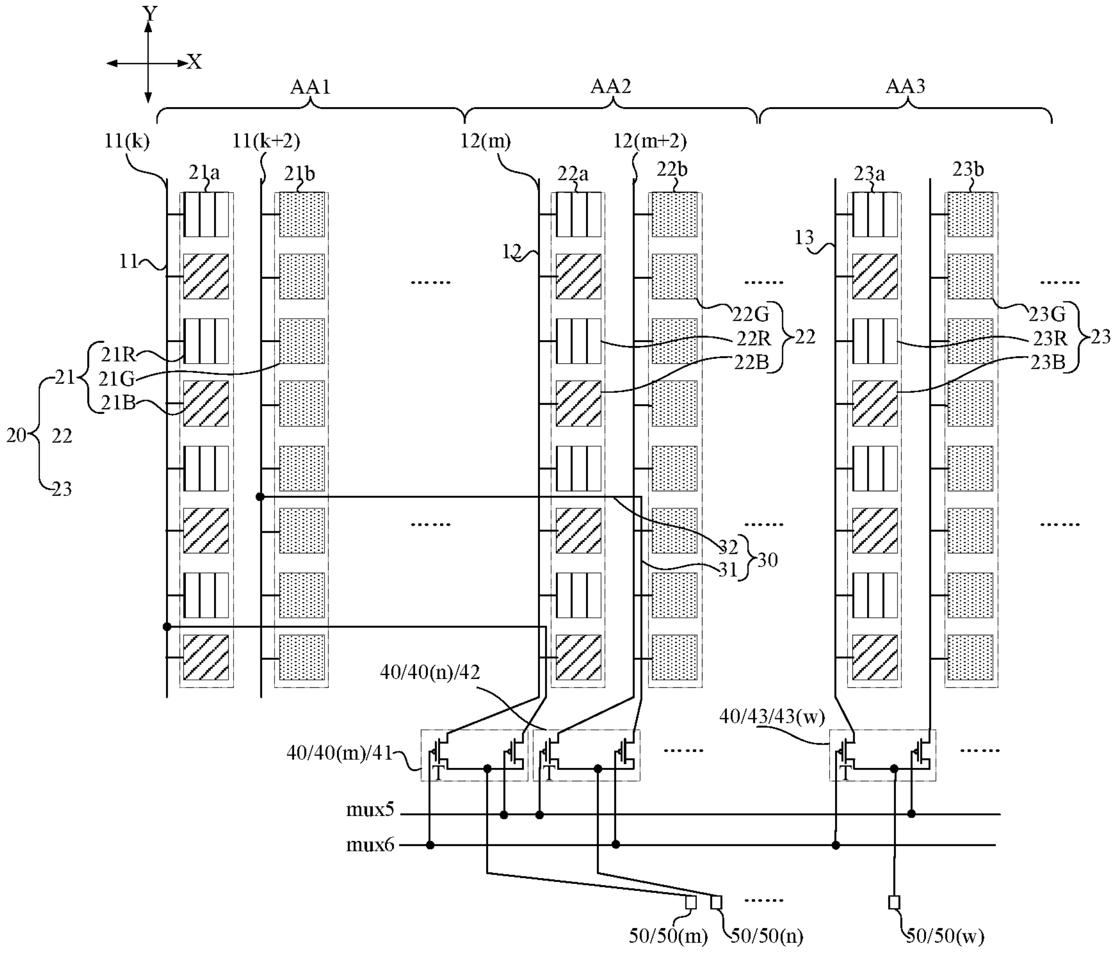
FIG. 13 illustrates another exemplary connection between a data line and a demultiplexer of an exemplary display panel according to various disclosed embodiments of the present disclosure.

As shown in FIG. 12 or FIG. 13, both the first demultiplexer 41 and the second demultiplexer 42 may include two switches.

As shown in FIG. 12, the turn-on sequence of the switches connected to the third sub-pixels 23 and the first sub-pixels 21 located in the same row and having the same light-emitting color may be same. In another embodiment, as shown in FIG. 13, the switches connected to the third sub-pixels 23 and the second sub-pixels 22 located in the same row and having the same light emission color may be turned on in a same order. The specific connection relationship of each structure in FIG. 12 and FIG. 13 will not be repeated here.

In some optional embodiments, N1=N2=N3. In such a configuration, the complexity of the driving sequence may be reduced, and the overall layout structure of the display panel may be simplified.

For example, as shown in FIG. 10 or FIG. 11, N1=N2=N3=4. In some embodiments, N1=N2=N3=2. In other embodiments, N1, N2, and N3 may be equal to other values.

In some optional embodiments, the switches in the first demultiplexer 41, the second demultiplexer 42 and the third demultiplexer 43 with the same turn-on order may be transistors of the same type, and the control signal lines connected to the switches with the same turn-on sequence in the first demultiplexer 41, the second demultiplexer 42 and the third demultiplexer 43 may be same. Such a configuration may reduce the number of control signal lines, may be beneficial to narrow bezels.

For example, the switches with the same turn-on sequence in the first demultiplexer 41, the second demultiplexer 42 and the third demultiplexer 43 may be all P-type transistors, or the switches with the same turn-on sequence in the first demultiplexer 41, the second demultiplexer 42 and the third demultiplexer 43 may be all N-type transistors.

For a P-type transistor, its turn-on level may be a low level, and its turn-off level may be a high level. For an N-type transistor, the turn-on level may be a high level and the turn-off level may be a low level.

In some embodiments, as shown in FIG. 2, the transfer line 30 may include a first segment 31 and a second segment 32. The first segment 31 may extend along the second direction Y, and the second segment 32 may extend along the first direction X. The second segment 32 may be connected between the first data line 11 and the first segment 31. The first segment 31 may be connected to the demultiplexer 40. The second direction Y may intersect the first direction X. The first segment 31 may be located in the second area AA2, and the first segment 31 connected to the same demultiplexer 40 may be adjacent to the second data line 12.

By setting the first segment 31 in the second area AA2, and the first segment 31 and the second data line 12 connected to the same demultiplexer 40 adjacent to each other, the demultiplexer 40 may be connected to the first segment 31 and the second data line 12 through a connection line. The distances between the second data lines 12 may be similar, which may facilitate the arrangement of connection lines.

In one embodiment, the sub-pixels connected to the adjacent first segment 31 and the second data line 12 may emit light of a same color.

Orthographic projections of the first segment 31 and the second data line 12 on the light-emitting surface of the display panel may overlap or may not overlap.

For example, the orthographic projections of the first segment 31 and the second data line 12 on the light-emitting surface of the display panel may not overlap. In the first direction, the first segment 31 may be located between the second data line 12 and the second sub-pixels 22 connected by the second data line 12.

Figure 14:
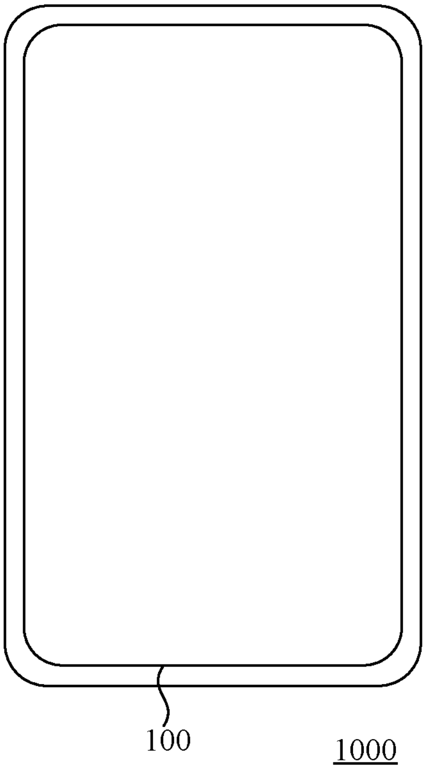
FIG. 14 illustrates an exemplary display device according to various disclosed embodiments of the present disclosure.

The present disclosure also provides a display device. The display device may include a present disclosed display panel, or other appropriate display panel. FIG. 14 illustrates an exemplary display device according to various disclosed embodiments of the present disclosure. As shown in FIG. 14, the display device 1000 may include the display panel 100 provided in any of the above-mentioned embodiments of the present disclosure. The embodiment in FIG. 14 only takes a mobile phone as an example to illustrate the display device 1000. It can be understood that the display device provided in the embodiment of the present disclosure may be wearable products, computers, televisions, vehicle-mounted display devices and other devices with display functions. The display device is not specifically limited in this disclosure. The display device provided by the embodiment of the present disclosure has the beneficial effects of the display panel provided by the embodiment of the present disclosure. For details, reference may be made to the specific descriptions of the display panel in the above embodiments, and details will not be described in this embodiment here.

Thus, according to the display panel and the display device provided by the embodiments of the present disclosure, for the data lines connected to the same demultiplexer, the light-emitting color of the first sub-pixels connected to the i-th first data line may be the same as that of the second sub-pixels connected to the j-th second data line may be same. Accordingly, the types of light-emitting colors of the sub-pixels connected to the data signal terminals connected to the demultiplexer may be reduced. For example, when displaying a white screen, the demultiplexer may sequentially transmit the same data signal to the first data line and the second data line. Therefore, the signal inversion frequency of the data signal terminal connected to the demultiplexer may be reduced, for example, the signal inversion frequency of the driving chip may be reduced or even no inversion for the driving chip, which may be beneficial to reducing the power consumption of the driving chip.

In accordance with the embodiments of the present disclosure as described above, these embodiments do not describe all details in detail, nor do they limit the disclosure to only the specific embodiments described. Obviously, many modifications and variations are possible in light of the above description. This description selects and specifically describes these embodiments to better explain the principles and practical applications of the present disclosure, such that those skilled in the art may make good use of the present disclosure and its modifications based on the present disclosure. This disclosure is to be limited only by the claims, along with their full scope and equivalents.

What is claimed is:

1. A display panel comprising:

a display area including a first area, a second area and a first edge, wherein, in a first direction, the second area is located at a side of the first area away from the first edge, and an extending direction of the first edge intersects the first direction;

a plurality of first data lines located in the first area and connected to first sub-pixels in the first area;

a plurality of second data lines located in the second area and connected to second sub-pixels in the second area;

a plurality of transfer lines located in the display area and connected to the plurality of first data lines in a one-to-one correspondence; and a plurality of demultiplexers including a number N of switches, input terminals of the number N of switches of a same demultiplexer being connected together;

wherein:

a first data line is connected to a demultiplexer through a transfer line, and a number i of first data lines and a number j of second data lines are connected to output terminals of the number N of switches in the same demultiplexer in a one-to-one correspondence;

for the same demultiplexer, a light-emitting color of first sub-pixels connected to the number i of first data lines is same as a light-emitting color of second sub-pixels connected to the number j of second data lines; and N≥2, and i+j=N.

2. The display panel according to claim 1, wherein:

N is an even number and i=j.

3. The display panel according to claim 1, wherein the demultiplexer comprises:

a first demultiplexer and a second demultiplexer, wherein:

a number i1 of first data lines and a number j1 of second data lines are connected to output terminals of a number N1 of switches in a same first demultiplexer in a one-to-one correspondence, and for the same first demultiplexer, a light-emitting color of first sub-pixels connected to the number i1 of first data lines is same as a light-emitting color of second sub-pixels connected to the number j1 of second data lines, N1≥2, and i1+j1=N1;

a number i2 of first data lines and a number j2 of second data lines are connected to output terminals of a number N2 of switches in a same second demultiplexer in a one-to-one correspondence, and for the same second demultiplexer, a light-emitting color of first sub-pixels connected to the number i2 of first data lines is same as a light-emitting color of second sub-pixels connected to the number j2 of second data lines, N2≥2, and i2+j2=N2; and the light-emitting color of the first sub-pixels connected to the number i1 of first data lines corresponding to the first demultiplexer is different from the light-emitting color of the first sub-pixels connected to the number i2 of first data lines corresponding to the second demultiplexer, and the light-emitting color of the second sub-pixels connected to the number j1 of second data lines corresponding to the first demultiplexer is different from the light-emitting color of the second sub-pixels connected to the number j2 of second data lines corresponding to the second demultiplexer.

4. The display panel according to claim 3, wherein:

i1=j1 and i2=j2.

5. The display panel according to claim 4, wherein:

i1=i2 and j1=j2.

6. The display panel according to claim 3, wherein:

i1=j1=2 and i2=j2=2.

7. The display panel according to claim 6, wherein:

the first data line and the second data line extend in a second direction, and the second direction intersects the first direction;

every two adjacent columns of first sub-pixels in the first area include a first sub-pixel column and a second sub-pixel column, the first sub-pixel column includes first sub-pixels of two light-emitting colors alternately arranged in the second direction, the second sub-pixel column includes first sub-pixels of one light-emitting color, and the light-emitting color of the first sub-pixel column is different from the light-emitting color of the second sub-pixel column;

four first data lines connected to every two adjacent columns of first sub-pixels in the first area are respectively the k-th first data line, the (k+1)-the first data line, the (k+2)-th first data line and the (k+3)-th first data line arranged in the first direction, the k-th first data line and the (k+3)-th first data line are connected to first sub-pixels in odd-numbered rows of different columns, and the (k+1)-th first data line and the (k+2) first data line are connected to first sub-pixels in even-numbered rows of different columns;

every two adjacent columns of second sub-pixels in the second area include a third sub-pixel column and a fourth sub-pixel column, the third sub-pixel column includes second sub-pixels of two light-emitting colors alternately arranged in the second direction, the fourth sub-pixel column includes second sub-pixels of one light-emitting color, a light-emitting color of the third sub-pixel column is same as the light-emitting color of the first sub-pixel column, and the light-emitting color of the fourth sub-pixel column is same as the light-emitting color of the second sub-pixel column;

four second data lines connected to every two adjacent columns of second sub-pixels in the second area are respectively an m-th second data line, an (m+1)-th second data line, an (m+2)-th second data line, and an (m+3)-th second data line arranged in the first direction, the m-th second data line and the (m+3)-th second data line are connected to second sub-pixels in odd-numbered rows in different columns, and the (m+1)-th second data line and the (m+2)-th second data line are connected to second sub-pixels in even-numbered rows in different columns; and the k-th first data line, the (k+1)-th first data line, the m-th second data line, and the (m+1)-th second data line are connected to output terminals of a number N1 of switches in a same first demultiplexer in a one-to-one correspondence, and the (k+2)-th first data line, the (k+3)-th first data line, the (m+2)-th second data line, and the (m+3)-th second data line are connected to output terminals of a number N2 of switches in a same second demultiplexer in a one-to-one correspondence.

8. The display panel according to claim 7, wherein:

a turn-on sequence of four switches connected to the k-th first data line, the (k+1)-th first data line, the (k+2)-th first data line and the (k+3)-th first data line is different from a turn-on sequence of four switches connected to the m-th second data line, the (m+1)-th second data line, the (m+2)-th second data line, and the (m+3)-th second data line.

9. The display panel according to claim 8, wherein:

the four switches connected to the k-th first data line, the (k+1)-th first data line, the (k+2)-th first data line, and the (k+3)-th first data line are sequentially turned on with a sequence of first, third, fourth and second; and the four switches connected to the m-th second data line, the (m+1)-th second data line, the (m+2)-th second data line, and the (m+3)-th second data line are sequentially turned on with a sequence of second, fourth, third and first.

10. The display panel according to claim 3, wherein:

i1=j1=1 and i2=j2=1.

11. The display panel according to claim 10, wherein:

the first data line and the second data line extend in a second direction, and the second direction intersects the first direction;

each two adjacent columns of first sub-pixels in the first area include a first sub-pixel column and a second sub-pixel column, the first sub-pixel column includes first sub-pixels of two light-emitting colors alternately arranged in the second direction, the second sub-pixel column includes first sub-pixels of one light-emitting color, a light-emitting color of the first sub-pixel column is different from a light-emitting color of the second sub-pixel column, the first sub-pixel column is connected to a p-th first data line, and the second sub-pixel column is connected to a (p+1)-th first data line;

every two adjacent columns of second sub-pixels in the second area include a third sub-pixel column and a fourth sub-pixel column, the third sub-pixel column includes second sub-pixels of two light-emitting colors alternately arranged in the second direction, the fourth sub-pixel column includes fourth sub-pixels of one light-emitting color, a light-emitting color of the third sub-pixel column is same as the light-emitting color of the first sub-pixel column, a light-emitting color of the fourth sub-pixel column is same as the light-emitting color of the second sub-pixel column, the third sub-pixel column is connected to an s-th second data line, and the fourth sub-pixel column is connected to an (s+1)-th second data line; and the p-th first data line and the s-th second data line are connected to output terminals of the number N1 of switches in a same first demultiplexer in a one-to-one correspondence, and the (p+1)-th first data line and the (s+1)-th second data line are connected to output terminals of the number N2 of switches in the same second demultiplexer in a one-to-one correspondence.

12. The display panel according to claim 11, wherein:

a turn-on sequence of two switches connected to the p-th first data line and the (p+1)-th first data line is different from a turn-on sequence of two switches connected to the s-th second data line and the (s+1)-th second data line.

13. The display panel according to claim 12, wherein:

the two switches connected to the p-th first data line and the (p+1)-th first data line are sequentially turned on with a sequence of first and second; and the two switches connected to the s-th second data line and the (s+1)-th second data line are sequentially turned on with a sequence of second and first.

14. The display panel according to claim 3, wherein the display panel further comprises:

a third area, wherein:

in the first direction, the third area is located on a side of the first area away from the first edge;

the display panel further includes a plurality of third data lines located in the third area connected to the third sub-pixels in the third area;

the demultiplexer also includes a third demultiplexer, a number N3 of third data lines are connected to output terminals of the number N3 of switches in a same third demultiplexer in a one-to-one correspondence, and N3≥2; and turn-on sequences of switches connected to the third sub-pixels and the first sub-pixels located in a same row and having a same light-emitting color are same; or turn-on sequences of switches connected to the third sub-pixels and the second sub-pixels located in a same row and having a same light-emitting color are same.

15. The display panel according to claim 14, wherein: N1=N2=N3.

16. The display panel according to claim 15, wherein:

switches with a same turn-on sequence in the first demultiplexer, the second demultiplexer and the third demultiplexer are transistors of a same type; and control signal lines connected to the switches with the same turn-on sequence in the first demultiplexer, the second demultiplexer and the third demultiplexer are same.

17. The display panel according to claim 1, wherein the transfer line comprises:

a first segment and a second segment, wherein:

the first segment extends in a second direction, the second segment extends in the first direction, the second segment is connected between the first data line and the first segment, the first segment is connected to the demultiplexer, and the second direction intersects the first direction; and the first segment is located in the second area, and the first segment connected to the same demultiplexer is adjacent to the second data line.

18. A display device comprising:

a display panel, wherein the display panel includes:

a display area including a first area, a second area and a first edge, wherein, in a first direction, the second area is located on a side of the first area away from the first edge, and an extending direction of the first edge intersects the first direction;

a plurality of first data lines located in the first area and connected to first sub-pixels in the first area;

a plurality of second data lines located in the second area and connected to second sub-pixels in the second area;

a plurality of transfer lines located in the display area and connected to the plurality of first data lines in a one-to-one correspondence; and a plurality of demultiplexers including a number N of switches, input terminals of the number N of switches of a same demultiplexer being connected, wherein:

a first data line is connected to a demultiplexer through a transfer line, and a number i of first data lines and a number j of second data lines are connected to output terminals of the number N of switches in the same demultiplexer in a one-to-one correspondence;

for the same demultiplexer, a light-emitting color of first sub-pixels connected to the number i of first data lines is same as a light-emitting color of second sub-pixels connected to the number j of second data lines; and N≥2, and i+j=N.

* * * * *